(12) United States Patent
King

(10) Patent No.: US 8,041,638 B2
(45) Date of Patent: Oct. 18, 2011

(54) ROUTER-BASED REMITTANCE SYSTEMS AND METHODS

(76) Inventor: Daniel King, Lakeville, MN (US)

( * ) Notice: Subject to any disclaimer, the term of this patent is extended or adjusted under 35 U.S.C. 154(b) by 0 days.

(21) Appl. No.: 12/756,307

(22) Filed: Apr. 8, 2010

(65) Prior Publication Data

US 2010/0198723 A1   Aug. 5, 2010

Related U.S. Application Data

(63) Continuation of application No. 11/820,163, filed on Jun. 18, 2007, now Pat. No. 7,725,392.

(60) Provisional application No. 60/814,847, filed on Jun. 19, 2006.

(51) Int. Cl.
*G06Q 40/00* (2006.01)
(52) U.S. Cl. ............... 705/40; 705/35; 705/39
(58) Field of Classification Search ............ 705/40
See application file for complete search history.

(56) References Cited

U.S. PATENT DOCUMENTS

| | | | |
|---|---|---|---|
| 4,823,264 A | 4/1989 | Deming | |
| 5,231,569 A | 7/1993 | Myatt et al. | |
| 5,265,007 A | 11/1993 | Barnhard, Jr. et al. | |
| 5,283,829 A | 2/1994 | Anderson | |
| 5,317,732 A | 5/1994 | Gerlach, Jr. et al. | |
| 5,369,699 A | 11/1994 | Page et al. | |
| 5,383,113 A | 1/1995 | Kight et al. | |
| 5,465,206 A | 11/1995 | Hilt et al. | |
| 5,649,117 A | 7/1997 | Landry | |
| 5,652,786 A | 7/1997 | Rogers | |
| 5,699,528 A | 12/1997 | Hogan | |
| 5,903,878 A | 5/1999 | Talati et al. | |
| 5,946,669 A | 8/1999 | Polk | |
| 6,119,107 A * | 9/2000 | Polk | 705/40 |
| 6,373,950 B1 | 4/2002 | Rowney | |
| 7,725,392 B2 * | 5/2010 | King | 705/40 |
| 2001/0044764 A1 | 11/2001 | Arnold | |
| 2005/0137972 A1 * | 6/2005 | Krumlauf | 705/40 |
| 2005/0228751 A1 | 10/2005 | Keown et al. | |

OTHER PUBLICATIONS

California State Disbursement Unit Electronic Funds Transfer Employer Information Guide, 2008.*
Board of Governors of the Federal Reserve System/Washington D.C., www.federalreserve.gov.
"Child Support Application Banking Convention: A Guide for Employers & Their Financial Institutions," published by Bankers EDI Council (1996).
Direct Payment www.electronicpayments.org.
EC/EDI: The Basics www.sbaonline.sba.gov/gopher/Ecedi/Info/eced5.txt.
The National Automated Clearing House Association www.nacha.org.
User Guide for Electronic Child Support Payments Using the Child Support Application Banking Convention Version 5.0 (Revised Aug. 21, 2006).
Value Added Networks www.en.wikipedia.org/wiki/Value-added_network.

* cited by examiner

*Primary Examiner* — Jason M Borlinghaus
*Assistant Examiner* — Hao Fu
(74) *Attorney, Agent, or Firm* — Curtis B. Herbert; Dardi & Herbert, PLLC

(57) ABSTRACT

In some aspects, what is disclosed relates to a processor-based payment method for transferring user-provided payment data through a router that parses the payment data and transfers the parsed data to a plurality of receivers in distinct locations, detecting the parsed data at each of the plurality of receivers, and originating an ACH debit against the user, or an e-check, based on the parsed data.

3 Claims, 1 Drawing Sheet

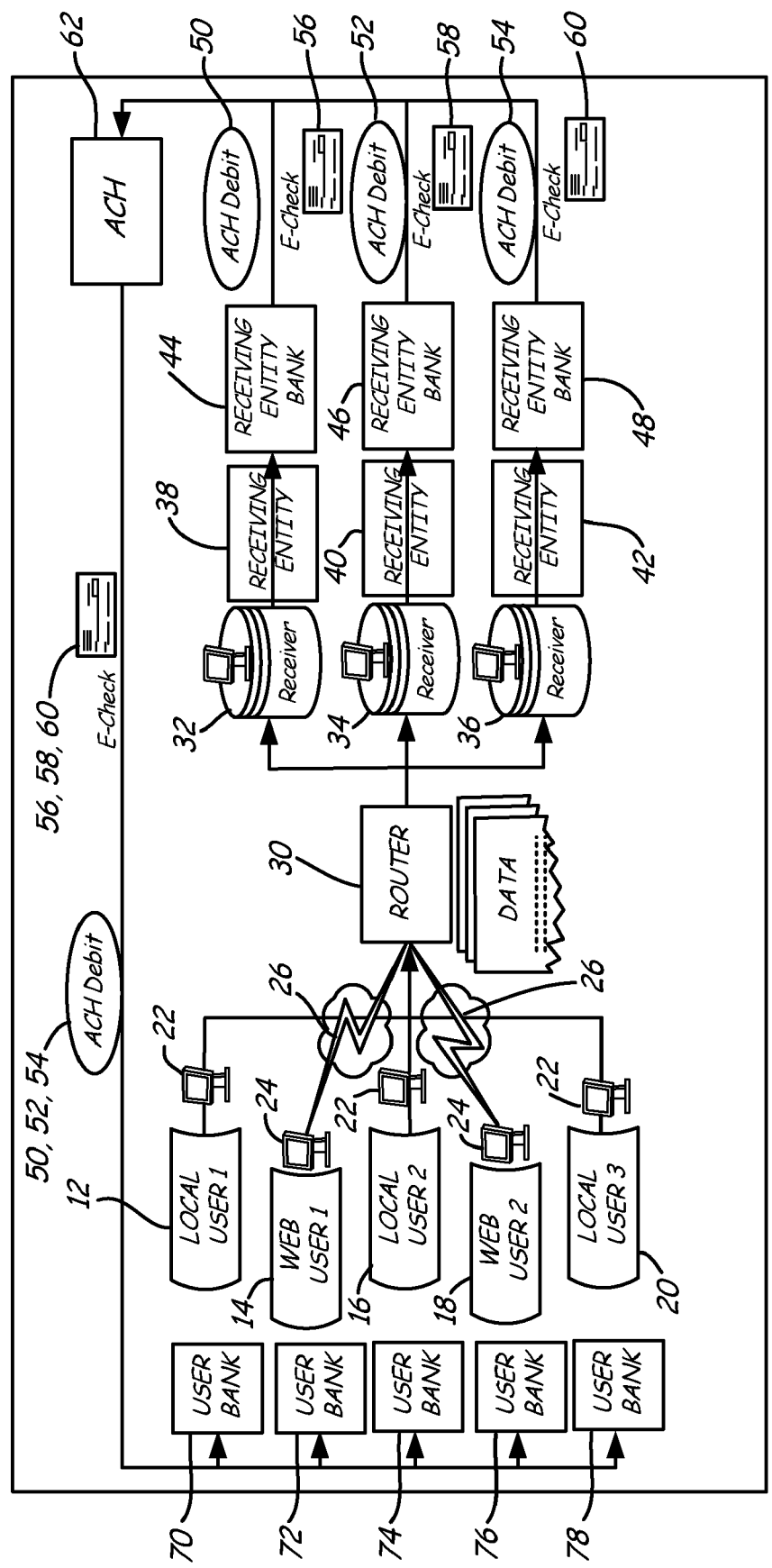

ROUTER-BASED REMITTANCE SYSTEMS AND METHODS

CROSS REFERENCE TO RELATED APPLICATION

The application is a continuation of U.S. patent application Ser. No. 11/820,163, filed Jun. 18, 2007 now U.S. Pat. No. 7,725,392, which claims priority to U.S. Provisional Patent No. 60/814,847, filed Jun. 19, 2006, which are hereby incorporated by reference herein.

FIELD OF THE INVENTION

The field of the invention relates generally to the payment and processing of payments. More particularly, the field of certain embodiments of the invention relates to a method and apparatus for processing child support payments using debit-based electronic funds transfer without a corresponding Financial Electronic Data Interchange (FEDI).

BACKGROUND

If an employer/entity is required to withhold child support from employees/obligors and forward the payment(s) to State Disbursement Units (SDUs) around the country, it currently has the following choices:
  a) Send a paper check including remittance that provides the payment information for each of the employees;
  b) Create an Automated Clearing House (ACH) Financial Electronic Data Interchange (FEDI) credit transaction in the approved CS Banking Convention addenda format embedded within either a cash concentration or disbursement plus addenda (CCD+) or corporate trade exchange (CTX) format using:
    i) its own internally developed software,
    ii) commercial off-the-shelf software (COTS), or
    iii) bank-provided software;
  d) contract with a third party provider (ADP, Ceridian, Paychex, or ACS via Expert Pay) to act as an accumulator to consolidate the payment information and create a single ACH debit to the employers account and originating multiple ACH FEDI credit transaction credits to each SDU; or
  e) Register and interact with each SDU that provides the option, to have the SDU debit the employers account for the payments submitted to the SDU via a web site or telephone Interactive Voice Response (IVR) system.

SUMMARY AND DETAILED DESCRIPTION OF THE INVENTION

The child support payment system has a number of characteristics that distinguish it from other systems or industries. One characteristic is that an employer/entity can be tasked by a third party to collect the payments from employees and deliver them to one of over fifty states, with each payment being unique to the employee. By way of contrast, withholding for taxes involves treating each employee the same, as per a government schedule, and delivering the money to a central location. Or withholding for retirement funds is an option that an employer sets up and then seeks employee approval or input. Each child support payment is determined on a case-by-case basis and must be paid to a state government office according to the legal situation of the child or employee. Moreover, the existing infrastructure for processing financial data is complex so that some software options that are available for electronic communications or other systems may not be readily adapted.

As a result of its uniqueness, the child support payment system has complexities that are not appreciated by programmers or financial workers. Employer/entities often have more than one, and sometimes many, child support payments to manage. One aspect of this management process is to send the correct amount of money to the correct location (usually a state's State Disbursement Unit, SDU) along with the correct information that will direct the money as needed. For instance, an employer might send a single sum to a single state along with information for dividing the sum as per the needs of ten different employees. If an employer/entity does not have any capability to process payments electronically, it sends either multiple checks with single payment remittance, or a single check with multiple payment remittance. If sending multiple checks, there are additional costs to the employer for creating, mailing and reconciling the checks. If sending a single check with multiple payment remittance, it saves check processing cost, but put the burden of processing complex and disparate remittance documents on each of the SDUs throughout the country.

Others have addressed the problems in the child support payment industry. One approach is for the employer/entity to create its own ACH Credit transactions. If an employer/entity is credit worthy (based on its depository banks standards), and chooses to create its own ACH Credit transactions, it bears the burden of paying for the software, developing the software, or paying for the service from its bank. It is also are required to pass each SDU electronic funds transfer (EFT) testing process for authentication and file and data testing which varies widely across SDUs prior to being provided the SDU banking information. In addition, the employer then bears the cost of the payment transaction costs associated with processing through the ACH network. These costs typically involved daily file fees, fees related to the number of payments, and/or fees related to the size of the ACH/EDI file in bytes.

Another approach is to create software that manages conventional payment options. If an employer/entity chooses to contract with a third party service provider, they bear the burden of paying for the service and/or software either typically based on the size of the employer and/or the number of transactions being created. The third party service provider, sometimes referred to as an accumulator, generates a debit to the employer account to cover the payments and any associated fees. These third party providers typically then create an ACH credit transactions to be sent to the SDU's, unless the third party is also contracted with an SDU to provide web based debit options for employers.

Yet another approach uses web-based systems. If an employer/entity chooses to utilize the SDU debit based web-sites that exist, they are burdened with registering with different web sites requiring different registration and authentication steps and passwords. They have no consolidated reporting mechanism for tracking payments made and must interact with each web or IVR system to get and report information. Moreover, since only a handful of SDU's actually provide SDU debit options, employers end up using a cross section of the available methods further complicating their internal reporting requirements.

There are thus many systems for managing support payments. Each has certain advantages and disadvantages relative to each other. It is possible, however, to improve over these conventional systems.

In fact, it is possible to use a router-based system to remit payments to thereby simplify the payment process for the user and SDUs. In some embodiments, the invention is a system using multiple disparate debit based electronic funds transfer transactions while transferring remittance data via a central or regional router to a receiver for each of the receiving entities such as an SDU or a bank for an SDU.

Thus a user may send payment data for a plurality of persons to a router that directs the data for each person to the appropriate receiver. The router may thus direct data to a plurality of receivers which may be in one or many distinct locations. Each receiver is then involved with origination of a debit against the user. Thus the user sends information via the router and the receivers initiate a debit. FIG. 1 depicts an embodiment of this arrangement. Advantageously, a user such as an employer/entity may use a router-based information transfer to easily process a payment without the need for an accumulator agency. In some aspects, the router-based system may include setting-up the receivers at a plurality of, or all of, the appropriate locations, e.g., at SDUs.

FIG. 1 depicts a system 10 used by local users 12, 14, 16, 18, or 20 may access such via a terminal for desktop software 22 or web-based software 24 that uses a web-interface 26 with users logging into a webserver. The user provides identifying information about the user during a registration and authentication process whereby they are issued a user identification and password. The user will manually input or import all the employees the user wants to make payments for.

The user submits the request to make a payment by transferring the data to router 30. The request is processed by router 30, wherein the router parses the data based on each of the receivers that are available. The router then passes the data to the appropriate receiver 32, 34, 36 that is located in, or associated with, receiver 38, 40, 42. Each receiver parses and interrogates the data and either returns an acknowledgment if acceptable or a reject of the request if unacceptable back to the router. If rejected, the router may forward the rejection to the user. If acknowledged, the router may forward the acknowledgment to the user so they are prepared to receive a corresponding debit or electronic check (e-check). An electronic check refers generally to a converted check processed through the ACH network with a referenced check number.

All acknowledged requests issued by the receiver for a debit transaction will be provided to the Receiving Entity Bank 44; 46, 48 where an ACH debit 50, 52, 54, or E-check 56, 58, 60 will be originated. Once the funds have been debited, the Receiving Entity can immediately process the funds into a system by using the data provided in the request, or they can choose to wait until the funds have cleared the two day ACH NSF return window. As depicted using the ACH system 62, the user's bank 70, 72, 74, 76, 78 will receive the ACH debit 50, 52, 54 or e-check 56, 58, 60 from each of the Receiving Entities that will correspond to its records for payments made to receiver.

Payment data typically comprises the user's information as well as pertinent information such as the Name, SSN, Case Number, and corresponding dollar amount for each employee/participant that the user wants to have credited at each receiver, once the receiver receives originates the debit against the users account.

User provided data refers to data entered or imported into preprocessing software located on the user's local machine or via web browser.

Each receiver may be associated with a receiving entity in a distinct location that may cover prescribed markets or jurisdictions. The receiving entities can originate their own ACH debits against multiple users via this method, which may be in addition to their own applications' debits but limited to single jurisdiction users; or without having to support any internal application.

A location of a receiver refers to a geographical location, e.g., a U.S. state, a particular state in a country, a country, or to a type of entity, e.g., a state agency, a bank, or a business. Receivers in distinct locations are located with different entities and are not at the same bank or user's offices.

The term router refers to a regional or central system that receives data from the user, parses the data received, and routes it to the appropriate receiver based on the data received from the user.

The term user refers to an employer/entity that is sending payment data via the web or desktop application to one or many receivers through a regional or central router.

The term receiver refers to the device at the endpoint of the payment data being routed. A receiving entity uses the routed data from the receiver. For example, the receiving entity may create an ACH Debit to a user's account.

Certain embodiments of the invention enable a receiving entity to originate an electronic payment and to process the payment as a receiving entity originated debit transaction. The term originate, in this embodiment, refers to the receiving entity originating the ACH Debit. The term electronic payment refers to the transfer of funds from a user to a receiver via a debit within the ACH network.

Another embodiment of the invention enables an initiator to initiate an electronic transfer of a check or an e-check and remittance information to a receiver to be electronically processed.

Some embodiments include a method of initiating a payment comprising, processes performed by a processor, of: a user creating (and optionally storing) payment data; transferring the payment data (e.g., over a network) to a router; the receiving and parsing of the payment data received at a router; the transferring of the parsed data to one or many receivers located in one or many locations; the receiving, storing and issuing an acknowledgment or rejection of the data at the receiver; the receiving of acknowledgment or rejection at the router; the transfer or reporting of the acknowledgement or rejection from the router to the initiator; the origination of an ACH debit by each receiver to each initiator for each acknowledged amount.

The term processor refers to devices that electronically process data, for example, a computer equipped with conventional hardware, including central processing unit (CPU), random access memory (RAM), display memory, video interface circuit (VIC), input/output controller (I/O), data storage device (disk), input device, display, external device, and network interface.

Examples of storing payment data are locally or via web server. If users want to store payment data locally, they do so, for example, by downloading software from a router, which then allows the user to store all the data within their own computer and/or network that will be able to send data to the router and receive data from the router. If users do not want to store payment data locally, rather they want to store remote, they can, for example, access the same preprocessor software that can be downloaded via a regional or central web portal associated with a router.

Some embodiments of the invention include a method of processing an e-check payment. This method comprises a method of initiating a payment comprising some or all of the steps, performed by a processor, of: a user creating and storing payment data; transferring payment data to a router; the receiving and parsing of payment data received at a router; the transferring of the data to one or many receivers located in one or many locations; the receiving, storing and, optionally, acknowledgment or rejection of the data at the receiver; the receiving of acknowledgment or rejection at the router; the transfer or reporting of the acknowledgement or rejection from the router to the initiator; the origination of an e-check by each receiver to each initiator for each acknowledged amount and check number. The resulting individual ACH debits or e-checks that are associated with each receiver and reconciled within a single reporting system, reduces the overall cost to the initiator.

Certain embodiments relate to a payment system, wherein an user creates a payment based on a child support order and/or a court ordering withholding of income. And certain embodiments include additional users (e.g., additional entities) or additional uses (e.g., additional services). The payment is processed as single or multiple debit transactions or a single or multiple paper check transactions. The processing of the debit transaction may occur using electronic funds transfer (EFT). The processing of the check transaction generally occurs by printing a paper check with no remittance. The remittance data associated to each payment is transferred from the initiator through the router to the receiver using an electronic data interchange (EDI) format.

In general, electronic signals may be sent directly or indirectly from one device to another. Thus a first computer may send data to another electronic device directly or through one or more electronic devices that are intermediaries.

Certain embodiments variously employ a variety of networks, either alone or in combination, with the term network including, for example, the Internet, an intranet, a wireless network, a wired network and a virtual private network.

REFERENCES

Each of these references are hereby incorporated by reference herein to the extent that they do not contradict what is explicitly disclosed.

"EDI Top Twenty, Questions and Answers About Electronic Data Interchange," Pamphlet published by Automated Clearing House Association (no date).

"ADP PC/Payroll for Windows," published by Automatic Data Processing, Inc. (1997), 04-1008-057 50M.

"New Hire Reporting," published by Automatic Data Processing, Inc. (1997), 04-914-067 40M.

"Wage Garnishment Processing Service," published by Automatic Data Process, Inc. (1996), 04-1045-086 20M.

"Child Support Application Banking Convention: A Guide For Employers & Their Financial Institutions," published by Bankers EDI Council (1996).

"1996 ACH Rules," published by National Automated Clearing House Association (1996).

Value Added Networks on the web at www.en.wikipedia.org/wiki/Value-added_network.

Board of Governors of the Federal Reserve System/Washington, D.C., on the web at www.federalreserve.gov.

Direct Payment, on the web at www.electronicpayments.org.

The National Automated Clearing House Association, on the web at www.nacha.org.

EC/EDI: The Basics, on the web at www.sbaonline.sba.gov/gopher/Ecedi/Info/eced5.txt.

User Guide for Electronic Child Support Payments Using the Child Support Application Banking Convention Version 5.0 (Revised Aug. 21, 2006).

U.S. Pat. No. 4,823,264 to Deming; U.S. Pat. No. 5,231, 569 to Myatt et al.; U.S. Pat. No. 5,265,007 to Barnhard, Jr. et al.; U.S. Pat. No. 5,283,829 to Anderson; U.S. Pat. No. 5,317, 732 to Gerlach, Jr. et al.; U.S. Pat. No. 5,369,699 to Page et al; U.S. Pat. No. 5,383,113 to Kight et al.; U.S. Pat. No. 5,465, 206 to Hilt et al.; U.S. Pat. No. 5,649,117 to Landry; U.S. Pat. No. 5,652,786 to Rogers; U.S. Pat. No. 5,699,528 to Hogan; U.S. Pat. No. 5,946,669 to Polk; and U.S. Pat. No. 6,119,107 to Polk.

Additional Description of Embodiments

One embodiment is a processor-based payment method comprising transferring user-provided payment data for a plurality of persons to a router that parses the payment data and transfers the parsed data to a plurality of receivers in distinct locations, detecting the parsed data at each of the plurality of receivers, and originating an ACH debit against the user or an e-check based on the parsed data. Another embodiment is a processor-based payment method comprising transferring user-provided payment data for a plurality of persons to a router that parses the payment data and transfers the parsed data to a plurality of receivers each associated with a receiving entity, with the receivers being in distinct locations, detecting the parsed data at each of the plurality of receivers, and originating an ACH debit against the user or an e-check via bank accounts of the receiving entities using data collected at each of the receivers for each acknowledged amount.

In some embodiments the parsed data is stored at each receiver. In some cases, however, some or all of the parsed data is rejected by at least one of the plurality of receivers, or all of them. One option is to have an acknowledgment or a rejection of the user-provided payment data provided by the router to a processor of the entity. Also, an acknowledgment or a rejection of the user-provided payment data may be provided by a receiver. In some cases, the payment information may relate to a child support payment. Alternatively, these systems may be used for non child-support payment systems. Also, the user-provided payment data may be entered into a processor of the user and sent from the processor to the router. Or the user-provided payment data may be sent through at least one other processor before reaching the router.

The invention claimed is:

1. A router-based payment method for processing payments related to government entities using debit-based electronic funds transfer without a corresponding Financial Electronic Data Interchange, comprising:

providing a router and a plurality of receivers, with the router being in electronic communication with the plurality of receivers each installed at a plurality of state government entities or state government entity banks, and wherein the router is a distinct device from the receivers;

assembling payment data, by a user computer, for a plurality of persons in electronic format that includes identities of state government entities each receiving a plurality of payments;

transferring, by the user computer, the payment data to the router;

parsing the payment data, by the router, according to the state government entities receiving the payments; and transferring, by the router, the parsed data directly to the electronic receivers of the state government entities receiving the payment, wherein the transfer from the router to the receivers is made over a network and not through a bank and not through an Automated Clearing House (ACH) system;

parsing and aggregating the data transferred from the router, by each said receiver, to determine a single payment amount required of the user;

wherein each said receiver is configured to return an acknowledgment back to the router if the parsed data is acceptable, and to return a rejection back to the router if the parsed data is unacceptable; and originating, by each said receiver at the state government entities or state government entity banks, a single ACH debit against the user or one e-check for the entire payment amount for the plurality of persons, wherein the debit or e-check is conducted without a corresponding Financial Electronic Data Interchange.

2. The method of claim 1 wherein the parsed data is stored by the router.

3. The method of claim 1 wherein the acknowledgement or the rejection of the user-provided payment data is forwarded by the router to the user.

* * * * *